United States Patent [19]

Takebe et al.

[11] Patent Number: 5,784,308
[45] Date of Patent: Jul. 21, 1998

[54] BINARY SUBTRACTION DEVICE

[75] Inventors: Makoto Takebe; Masao Hagiwara, both of Hiratsuka, Japan

[73] Assignee: Kabushiki Kaisha Komatsu Seisakusho, Japan

[21] Appl. No.: 751,796

[22] Filed: Nov. 18, 1996

Related U.S. Application Data

[60] Continuation of Ser. No. 436,981, May 8, 1995, abandoned, which is a division of Ser. No. 861,862, Jun. 17, 1992, Pat. No. 5,461,617.

[30] Foreign Application Priority Data

| Dec. 26, 1989 | [JP] | Japan | 1-336888 |
| Dec. 27, 1989 | [JP] | Japan | 1-343482 |
| Jan. 30, 1990 | [JP] | Japan | 2-19933 |
| Oct. 30, 1990 | [JP] | Japan | 2-113743 |
| Dec. 26, 1990 | [WO] | WIPO | PCT/JP90/01707 |

[51] Int. Cl.$^6$ ............................................. G06F 7/50
[52] U.S. Cl. ............................................. 364/770
[58] Field of Search ................................. 364/770, 768

[56] References Cited

U.S. PATENT DOCUMENTS

| 3,394,249 | 7/1968 | Abernathy et al. | 364/770 |
| 3,532,866 | 10/1970 | Schaefer et al. | 364/770 |
| 3,675,000 | 7/1972 | Lincoln et al. | 364/770 |
| 3,693,167 | 9/1972 | Teurnier | 364/770 |

*Primary Examiner*—David H. Malzahn
*Attorney, Agent, or Firm*—Welsh & Katz, Ltd.

[57] ABSTRACT

For arithmetically combining the values of two numbers, for example adding and subtracting, comprising a data deletion system for deleting values from input data and outputting the result. The system has a deletion number detection apparatus for finding a value on the basis of input data and output data, wherein an output data number setting device sets the bits of an output data number to be all "1" in logical value prior to sending that number to a down counter which subtracts the output number from the input number for the result.

4 Claims, 13 Drawing Sheets

BINARY SUBTRACTION DEVICE

This is a continuation of application, Ser. No. 08/436,981, filed May 8, 1995, (Abandoned), which is a division of application, Ser. No. 07/861,862, filed Jun. 17, 1992 ( Now U.S. Pat. No. 5,461,617).

TECHNICAL FIELD

The present invention generally relates to serial controllers which can be suitable used for a centralized control system of such various types of machines as presses, machine tools, construction machines, ships or airplanes and for a centralized control system of unmanned or automatic transportation machines or unmanned storehouses, and particularly, to a serial controller in which a main controller and a plurality of nodes are connected in series in the form of a closed loop and each of the nodes is connected with one or a plurality of sensors for outputting data and also with one or a plurality of actuators for inputting data.

BACKGROUND ART

When it is desired to centrally control presses, machine tools, construction machines, ships, airplanes, unmanned transportation machines or unmanned storehouses, a multiplicity of sensors for detecting states of the respective machines and a multiplicity of actuators for controlling the states of the respective machines are required. In the case where such a controller is applied to presses, for example, the number of such sensors and actuators amounts to more than 3000; and in the case of other machines, the number becomes larger than 3000.

There has been proposed a centralized control system for centrally controlling such sorts of machines, in which a plurality of nodes are connected in series and one or a plurality of sensors and one or a plurality of actuators are connected to each of the nodes and are also connected to a main controller in the form of a ring so that a signal issued from the main controller causes the respective nodes to be controlled.

In the case where the nodes are arranged to be connected in series in this way, how to secure the simultaneous of outputs of the respective sensors and the simultaneous of outputs of the respective actuators become important. For example, when such an arrangement is employed that addresses are allocated to the respective nodes to control the nodes on the basis of the addresses, a time delay caused by this address processing becomes a problem and it becomes impossible to secure the satisfactory simultaneous of collection of outputs of the sensors and of the control of the actuators.

To avoid this, the inventors of the present application have proposed a serial controller in which nodes are connected in series, no addresses are allocated to the respective nodes and instead the nodes are identified by their connection order, whereby the need for the address processing can be eliminated, the problem of the time delay caused by the address processing can be solved, and the configuration of the nodes can be remarkably simplified.

Such a serial controller is arranged as shown in FIG. 1. In the drawing, a main controller 100 performs general control over respective machines to be managed, groups of sensors 1-1, 1-2, . . . , and 1-N are connected to the respective machines to detect the states of the machines, and groups of actuators 2-1, 2-2, . . . , and 2-N controllably drive the respective machines. In its arrangement, the sensor groups 1-1 to 1-N and the actuator groups 2-1 to 2-N are connected to nodes 10-1 to 10-N respectively, and the nodes 10-1 to 10-N are connected in series with the main controller 100 to form a loop including the main controller.

In the operation of the system, signals indicative of the states of the machines issued from the respective sensors 1-1, 1-2, . . . , and 1-N are sent through the nodes 10-1, 10-2, . . . , and 10-N to the main controller 100 to collect and process the received signals at the main controller; whereas signals for driving of the respective actuators 2-1, 2-2, . . . , and 2-N are generated at the main controller 100 and then sent to the respective actuators 2-1, 2-2, . . . , and 2-N to drive the actuators 2-1, 2-2, . . . , 2-N.

FIG. 2 shows the frame structure of a data frame signal used in the system when the number N of nodes is 5. The data frame signal is issued from the main controller 100, passed through the nodes 10-1, 10-2, . . . , and 10-N and then returned back to the main controller 100. Part (a) of FIG. 2 shows the data frame signal immediately after issued from the main controller 100. Parts (b), (c), (d) and (e) of FIG. 2 show the data frame signals after issued from the nodes 10-1, 10-2, 10-3 and 10-4 respectively, and Part (f) of FIG. 2 shows the data frame signal (to be fed back to the main controller 100 when N=5) after issued from the node 10-5.

The contents of the respective signals having the frame structures of FIG. 2 are as follows.

STI; First start code indicative of the heading position of input data (sensor data) DI DI; Input data DIq; Input data from a sensor connected to the q-th node STO: Second start code indicative of the heading position of output data (actuator drive data).

DO; Output data (actuator drive data)

DOq; Output data to the actuator connected to the q-th node

SP; Stop code indicative of the terminating end position of a data string

CRC; Code (indicative of error contents) for CRC error check at the respective nodes ERR; Code indicative of error content and position The respective nodes 10-1 to 10-N shown in FIG. 1 operate to add the detection data DI of the sensors 1 connected to the node to between the start codes STI and STO and to remove the output data DO to the actuators 2 connected to the associated nodes from the output data immediately after the start codes STO respectively, as shown in Parts (b) to (f) of FIG. 2.

Accordingly, in this system, when such a data frame signal containing the actuator control data DO as shown in Part (a) of FIG. 2 is sent from the main controller 100 to the node 10-1, the data frame signal is sequentially propagated from the node 10-1 via the nodes 10-2, 10-3, 10-4 and to the node 10-5, which results in that the actuator control data DO in the data frame signal are allocated to the corresponding nodes and at the same time the detection data of the sensor group obtained at the respective nodes are taken into the data frame signal. As a result, when the data frame signal is fed back to the main controller 100, no actuator control data DO are contained in the frame signal and only the detection data of the sensor group are contained in the frame signal as shown in Part (f) of FIG. 2.

With the above arrangement, conventionally, the send period (which is a time from the send start time of one data frame signal to the send start time of the next data frame signal, which will be referred to as the "sampling time", hereinafter) of the data frame signal is set to be always constant in any system regardless of the scale of the system, that is, regardless of the number of sensors and the number of actuators in the system. And the constant sampling time is usually set to be suitable for a system having the maximum sensor number and the maximum actuator number. For this reason, the prior art system has had a problem that a system having a less number of sensors and a less number of actuators provides a longer interval time between one data frame signal and the next one with a lower data transmission efficiency and with deteriorated real time controllability. Further, the prior art system has been disadvantageous in that, since the output data length of the data frame signal is set according to one of the systems having the maximum actuator number independently of the scale of the system, a system having a less number of actuators provides a lower data transmission efficiency with deteriorated real-time controllability.

With the above system, when the system is started by turning ON its power supply, the main controller 100 generates such an initial frame signal as shown in FIG. 3 and sends it to the nodes to detect an input point number (the number of all bits for the sensor groups 1-1 to 1-N) and an output point number (the number of all bits for the actuator groups 2-1 to 2-N). Like the data frame signal shown in FIG. 2, the initial frame signal comprises a first start code STI, a second start code STO, output point number detection data DO', a stop code SP, a CRC code and an ERR code. In this connection, the output point number detection data DO' consists of "0s" of A bits to prevent the operation of the actuators at each node, where symbol A is set to be a number larger than the number B of all actuators used in this system.

Like the data frame signal already explained earlier, the initial frame signal is sequentially propagated to the nodes 10-1, 10-2, 10-3, 10-4 and 10-5, through which the output point number detection data DO' in the initial frame signal is allocated to the corresponding node and detection data of the sensor group obtained at the respective nodes are included into the initial frame signal. More specifically, at each of the respective nodes 10-1, 10-2, ..., and 10-N, the data DI of associated one of the sensor groups 1-1, 1-2, ..., and 1-N connected to the associated node is attached to the end of the first start code STI of the received initial frame signal, and data on associated one of the actuator groups 2-1, 2-2, ..., and 2-N connected to the associated node is extracted from the output point number detection data DO' following the second start code STO.

Then, the initial frame signal, which is passed through the nodes 10-1, 10-2, ..., and 10-(N-1) and issued from the node 10-N, is sent to the main controller 100 in the form of a signal having such a structure as shown in FIG. 4.

The main controller 100 counts the number E of bits in the data DI following the first start code SRI of the received initial frame signal, finds an input point number on the basis of its count result, counts the number C of bits in the data DO following the second start code STO of the received initial frame signal, subtracts the count value C from the bit number A of the output point number detection data DO' of the initial frame signal of FIG. 3 when issued, and finds an output point number from its subtraction result B (=A−C). And the main controller 100 determines the length of the actuator driving data DO in the usual data frame signal of FIG. 2 on the basis of the calculated output point number B.

That is, in this system, when the data A larger than the anticipated output point number B is output, the data A, as passed through the nodes, is removed by a number corresponding to the output point number B and thus data C (=A−B) is sent to the main controller 100. As a result, thereafter, the output point number B can be found by subtracting the count-down result C from the value A as a minuend (A−C).

Meanwhile, in the prior art system, for the subtraction processing of finding the above output point number B, a usual full adder circuit comprising a general purpose LSI which performs the adding operation based on a principle that 1's complement on a subtrahend is added to a minuend has been employed. In this system, in spite of the fact that even the full adder circuit itself is large in circuit scale, the number of circuits has been extremely large, because the input/output point numbers usually amount to thousands of bits.

In the aforementioned system, further, the main controller 100 issues the data frame signal of FIG. 2 with a predetermined sampling period as shown in FIG. 5(b), the respective nodes sequentially judge whether or not a predetermined time (which will be referred to as the broken-line detection time, hereinafter) has elapsed from the reception of the previous frame signal and when detecting the passage of the broken-line detection time, detect the generation of a broken line. More specifically, when a line between the nodes 10-2 and 10-3 is broken as shown in FIG. 5(a), the node 10-3, even when the broken-line detection time elapses after the reception of the previous data frame signal, fails to receive the next data frame signal and thus can detect a generation of the broken line. In the prior art system, the above broken-line detection time is set by means of hardware such as dip switches respectively depending on the scale and response property of the serial controller.

Though the above broken-line detection time is determined by the scale and response property of the system as mentioned above, it is required to be determined basically by the sampling period of the data frame signal. In other words, when the system of FIG. 5(a) is employed for example, the sampling period becomes small because the node number is as small as 3, which results in that it is necessary to also set the broken-line detection time to be short. This is because the setting of a large broken-line detection time for a small sampling period causes the system to be put in an uncontrollable state caused by the broken line for a long time, whereby the safety of the system is deteriorated.

On the contrary, when the number of nodes is large, the sampling period becomes large and thus the broken-line detection time also must be set to be correspondingly large. In other words, when a small broken-line detection time is set for a long sampling period, only a failure in the reception of the data frame signal corresponding to one frame due to a simple communication error undesirably results in the system erroneously detect it as the generation of a broken line.

With the prior art system, further, since the broken-line detection time is set on a hardware basis as mentioned above, not only its setting is troublesome but also a setting error might cause a trouble.

In view of such circumstances, it is an object of the present invention to provide a serial controller which can realize data transmission with a good transmission efficiency at all times regardless of the scale of the system.

Another object of the present invention is to provide a controller which can effect a predetermined binary subtraction with a less number of circuits.

A further object of the present invention is to provide a controller which can automatically set a broken-line detection time optimum according to the period of a frame signal easily while preventing generation of any troubles.

DISCLOSURE OF INVENTION

In a first invention, there is provided a serial controller in which one or a plurality of sensors and one or a plurality of actuators are connected to each of a plurality of nodes connected in series, the plurality of nodes are connected to a main controller in the form of a closed loop including the main controller, the main controller sends a data frame signal containing a first special code, a second special code and output data to the actuators, each of the nodes adds data from the sensors connected to the associated node to behind the first special code, and output data to the actuators connected to the associated node is extracted from behind the second special code; the main controller is characterized by comprising transmission means, before transmitting the data frame signal, for transmitting an initial frame signal containing the first special code, the second special code and data for detection of the number of the actuators;terminal bit number detection means for detecting a total bit number of the sensors and a total bit number of the actuators on the basis of the initial frame signal received through the plurality of nodes; and control means for variably controlling a transmission interval of the data frame signal according to a detection value of the terminal bit number detection means.

With the arrangement of the first invention, the main controller, prior to transmission of the data frame signal, issues the initial frame signal containing the first and second special codes and the signal for detection of the actuator number. Each of the nodes, when receiving the initial frame signal, inserts a data signal from the sensors connected to the associated node into between the first and second special codes, and extracts the data signal to the actuators connected to the associated node from behind the second special code. The main controller receives the initial frame signal passed through all the nodes in this way and detects the total sensor number on the basis of the data number of the signal following the first special code. The main controller also detects the total actuator number on the basis of the data number of the signal following the second special code. The main controller variably controls the transmission interval of the data frame signal according to the detected sensor number and the actuator number. In other words, the main controller shortens the transmission interval when the sensor number and the actuator number are small and lengthens the transmission interval when the sensor number and the actuator number are large. With the first arrangement, in this way, the transmission period of the data frame signal is variably controlled according to the terminal number of the system, so that it can be avoided that the smaller the number of terminals is the lower the transmission efficiency is, whereby real time control can be realized even for a small system.

In a second invention, there is provided a serial controller in which one or a plurality of sensors and one or a plurality of actuators are connected to each of a plurality of nodes connected in series, the plurality of nodes are connected to a main controller in the form of a closed loop including the main controller, the main controller sends a data frame signal containing a first special code, a second special code and output data to the actuators, each of the nodes adds data from the sensors connected to the associated node to behind the first special code, and output data to the actuators connected to the associated node is extracted from behind the second special code; main controller being characterized by comprising transmission means, before transmitting the data frame signal, for transmitting an initial frame signal containing the first special code, the second special code and data for detection of the number of the actuators;terminal bit number detection means for detecting a total bit number of the sensors and a total bit number of the actuators on the basis of the initial frame signal received through the plurality of nodes; and means for determining a data length of the output data to the actuators in the data frame signal on the basis of the total bit number of the actuators detected by the terminal bit number detection means.

In the second invention, since the data length of the output data in the data frame signal is determined by the total bit number of actuators actually detected with use of the initial frame signal, the transmission efficiency can be prevented from being reduced and thus real time control can be realized even for a small system.

In a third invention, there is provided a subtraction device for receiving a value A, counting down the value A by an unknown B ($B<A$) to obtain a count-down result C ($=A-B$) and then performing subtracting operation of the value A as a minuend and the count-down result C as a subtrahend to find the unknown B; the subtraction device being characterized by comprising setting means for setting bits of the minuend A to be all "1" in logical value and complement calculating means for setting the number of bits in the subtrahend C to be equal to the bit number of the value A, for finding 1's complement on the subtrahend C and for outputting an obtained complement value as a subtraction result ($A-C$) for finding the unknown B.

With the arrangement of the third invention, based on the fact that the minuend A can be set to be a value larger than the unknown B, the bits of the minuend A are set to be all "1" in logical value. Such setting enables the subtraction result of the value C of the subtraction result ($A-B$) as subtrahend and the value A as a minuend to be obtained as 1's complement on the subtrahend C. Accordingly, with the arrangement of the third invention, the specific binary subtraction can be carried out only by mainly finding the complement and thus the circuit scale can be remarkably reduced when compared with the case using the conventional full adder circuit.

In a fourth invention, there is provided, in a data deletion system for deleting B ($B<A$) of data from A of input data and outputting C ($=A-B$) of data, a deletion number detection device for finding the value B on the basis of the input data number A and the output data number C, the deletion number detection device being characterized by comprising output data number setting means for setting bits of the output data number A to be all "1" in logical value, and a down counter, which has the same number of bits as the value A and which bits are set to be all "1" in logical value in its initial state, for counting down the initial value by the input data number C to find the value B.

With the arrangement of the fourth invention, the bits of the output data number A to the data deletion system are set all "1", the down counter having the same bit number as the value A, before starting its operation, is initialized so that the bits of the counter are set to be all "1" and then counts down directly the input data number C from the initial value A to find the unknown B. That is, through the down counter, the input data number C is directly counted down from the output data number A to find the unknown B, whereby the above calculation can be attained without using any subtracters; while, since the bits of the initial value A are set in the down counter to be all "1", only the setting operation of the down counter enables its initialization.

In a fifth invention, there is provided, in a data deletion system for deleting B ($B<A$) of data from A of input data and outputting C($=A-B$) of data, a deletion number detection device for finding the value B on the basis of the input data number A and the output data number C; the deletion number detection device being characterized by comprising output data number setting means for setting bits of the output data number A to be all "1" in logical value and a down counter, which has the same number of bits as the value A and which bits are set to be all "0" in logical value in its initial state, for counting down the initial value by a number corresponding to the input data number C plus 1 to find the value B.

With the arrangement of the fifth invention, the down counter is initialized to be all "0" only by first resetting the down counter, and thereafter counts down a number (C+1) corresponding to the input number value C plus 1 from the initial set value to find the unknown B. That is, since a value counted down by 1 from the initial set value of all "0" becomes all "1", the down count value becomes the same as when the input number value C in this arrangement is counted down from the output data number A of all "1".

In this way, with the arrangements of the fourth and fifth inventions, since the down counter directly counts down the value C from the value A to find the unknown B, the above calculation can be carried out without using any subtracters. Further, since the initial value is set in the down counter to be all "1" or all "0", the need of an arrangement for loading the initial value can be eliminated and its initialization can be carried out only by setting or resetting the down counter, whereby the circuit scale can be remarkably reduced when compared with the prior art.

In a sixth invention, there is provided a serial controller in which a plurality of nodes and a main controller are connected in series through a signal line to transmit a predetermined data frame signal from the main controller through the signal line to the plurality of nodes at a predetermined period in one direction, and each of the plurality of nodes detects a broken line in the signal line upstream the associated node when failing to receive the data frame signal for a predetermined broken-line detection time or more; each of the node being characterized by comprising measurement means for measuring a reception interval of the data frame signal and broken-line detection time setting means for variably setting the broken-line detection time on the basis of a measured result of said measurement means.

With the arrangement of the sixth invention, the data frame signal is transmitted at a constant period from the main controller to the respective nodes. Each of the nodes measures a reception interval from the reception of the previous data frame signal to the reception of the next data frame signal and variably and automatically set the optimum broken-line detection time on the basis of the measured reception interval.

In a seventh invention, there is provided a serial controller in which a plurality of nodes and a main controller are connected in series through a signal line to transmit a predetermined data frame signal from the main controller through the signal line to the plurality of nodes at a predetermined period in one direction, and each of the plurality of nodes detects a broken line in the signal line upstream the associated node when failing to receive the data frame signal for a predetermined broken-line detection time or more, each of the nodes being characterized by comprising measurement means for measuring a reception interval of the data frame signal, selection means for receiving consecutively a plurality of measured values of said measurement means and for selecting one of the plurality of measured values which is most frequently measured or when the plurality of measured values are all identical, for selecting the identical measured value, comparison means for comparing the previous-time selected result of the selection means with the this time selected result and for selecting smaller one of the both results, and broken-line detection time setting means for variably setting the broken-line detection time on the basis of a comparison output of the comparison means.

That is, with the arrangement of the seventh invention, even when concentrated missing of the data frame signals causes a time larger than the correct period to be selected, the broken-line detection time can be set according to the previously selected correct period of the data frame signals.

In this way, with the arrangements of the sixth and seventh inventions, since the reception interval of the frame signals are measured and the broken-line detection time is variably set on the basis of the measured interval result, the broken-line detection time optimum for the actual system can be sequentially and automatically obtained. As a result, the troublesome setting and troubles caused by a setting error, which would often involved in the prior art case where the broken-line detection time is set on a hardware basis, can be eliminated in the present invention. Accordingly, the reliability and safety of the system are remarkably improved.

BEST MODE FOR CARRYING OUT THE INVENTION

An embodiment of the present invention will be detailed with reference to the accompanying drawings.

Figure 1:
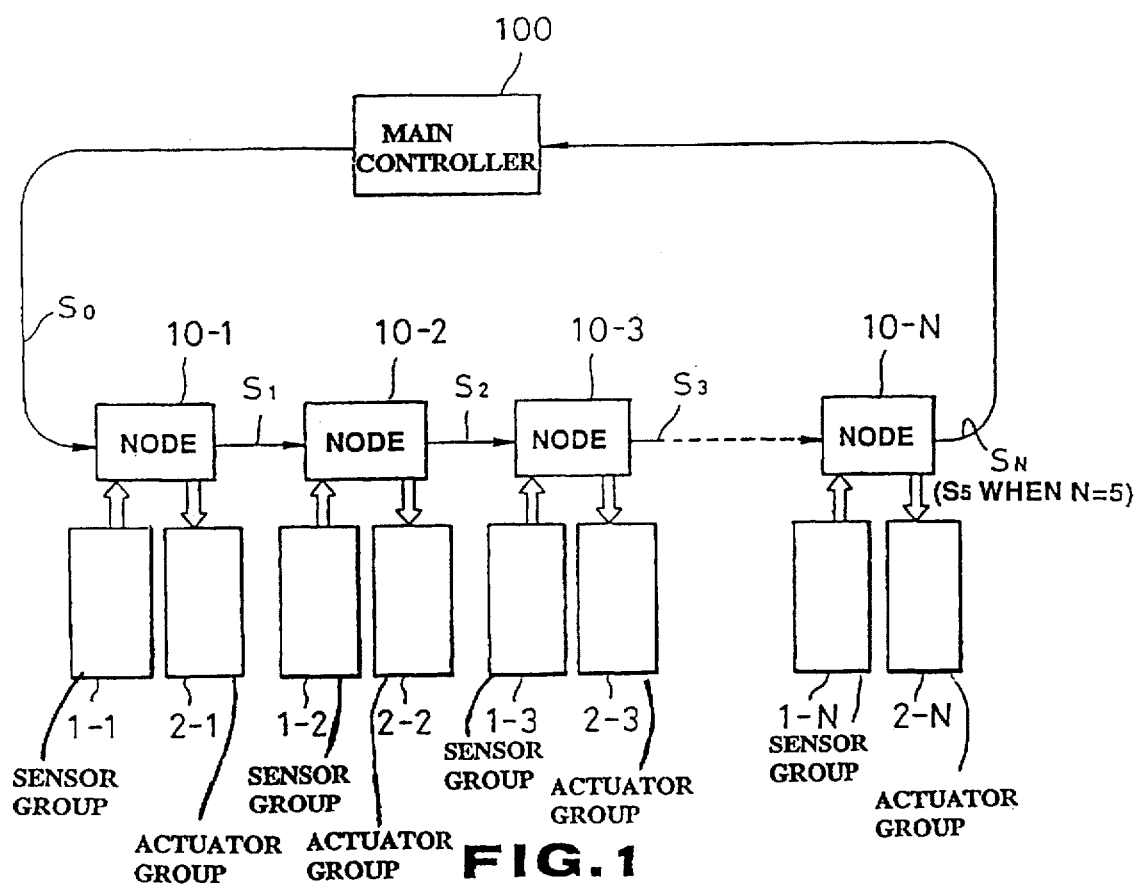
FIG. 1 is a block diagram of a general arrangement of a serial controller in accordance with the present invention.
Figure 6:
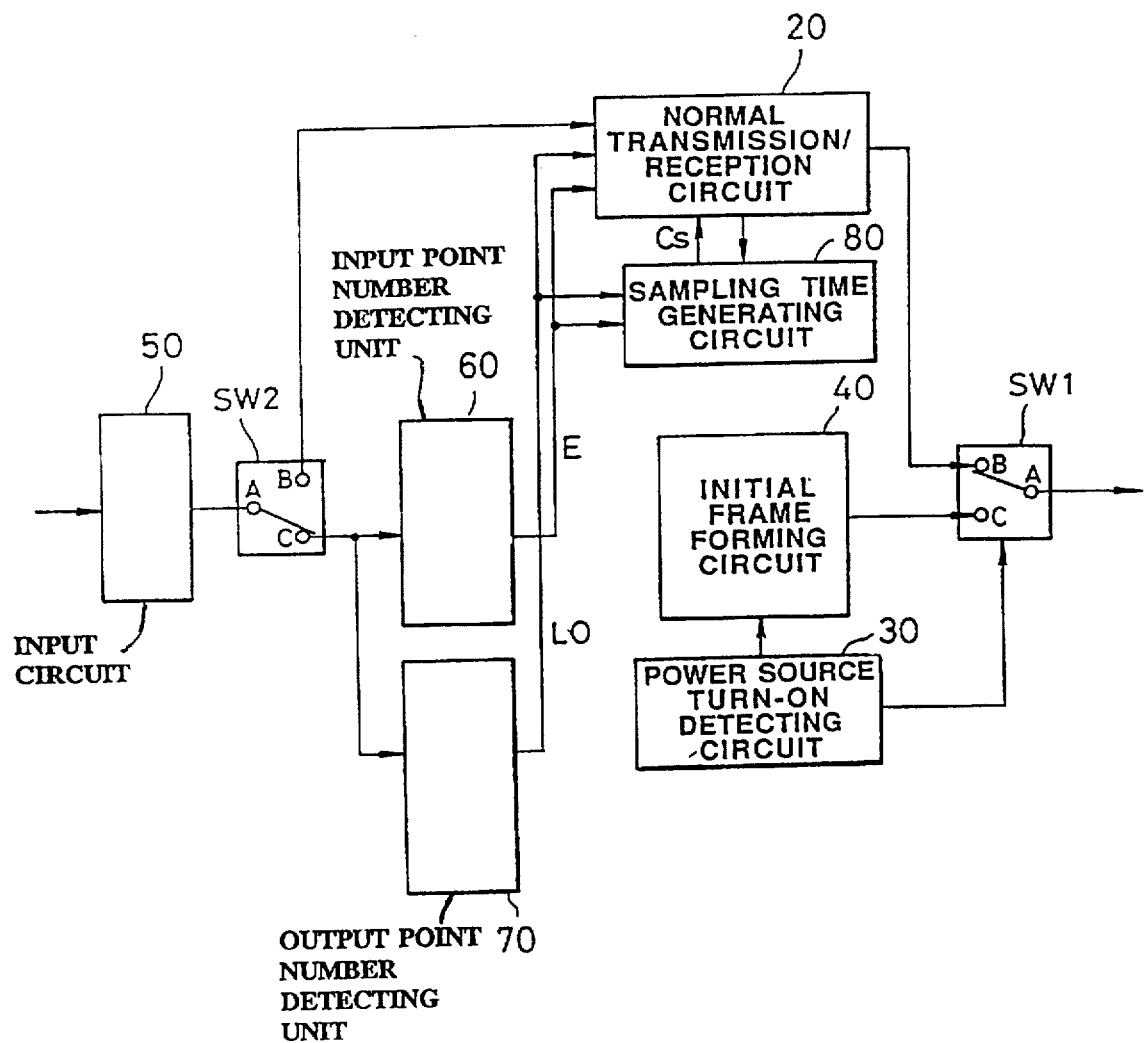
FIG. 6 is a block diagram of an embodiment of the present invention.

FIG. 6 schematically shows an interior structure of a main controller 100 in a serial controller of FIG. 1.

In FIG. 6, a normal transmission/reception circuit 20 executes usual operations including control of groups of sensors 1-1, 1-2, . . . , and 1-N as well as groups of actuators 2-1, 2-2, . . . , and 2-N. In more detail, the normal transmission/reception circuit 20 generates the aforementioned data frame signal (refer to FIG. 2(a)) containing the data DO for control of the actuator groups 2-1, 2-2, . . . , and 2-N connected to the respective nodes, and sequentially sends data frame signal through a switch SW1 set in its contact position B-A to the nodes 10-1, 10-2, . . . , and 10-N. The normal transmission/reception circuit 20 does not form the subject matter or gist of the present invention and thus the additional detailed explanation thereof is omitted.

When the system is started by turning ON a power source, a power source turn-on detecting circuit 30 detects the start of the system, and operates an initial frame forming circuit 40 on the basis of the detection to cause the switch SW1 to be switched to its contact position A-C.

Figure 2:
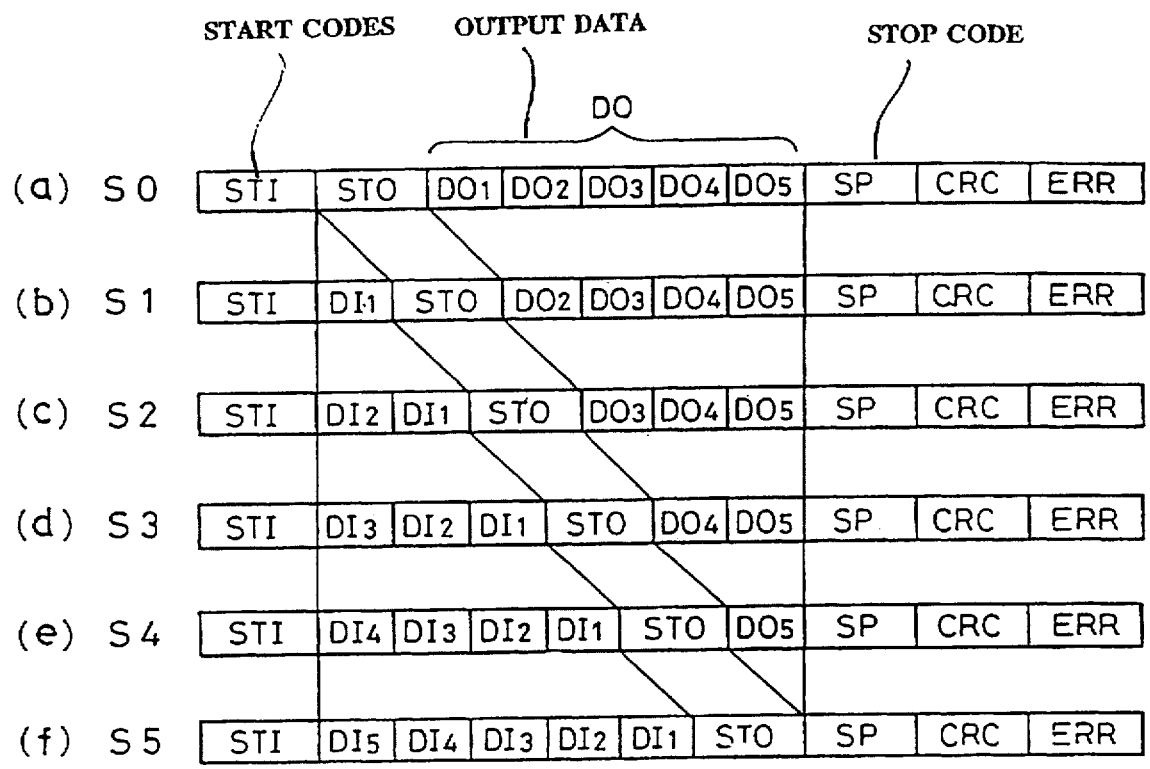
FIG. 2 is a diagram for explaining the propagation state of a data frame signal.
Figure 3:
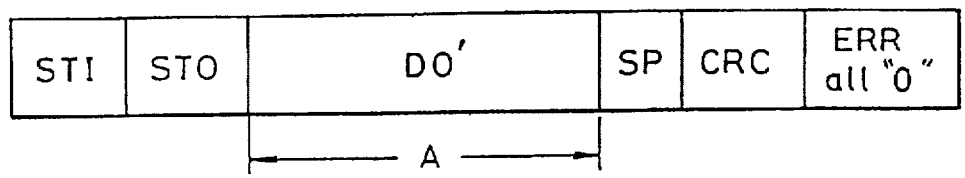
FIGS. 3 and 4 show initial frame signals respectively.

The initial frame forming circuit 40, when receiving the detection signal from the power source turn-on detecting circuit 30, generates such an initial frame signal as shown in FIG. 3 and sends it to the switch SW1 set in the contact position A-C. Like the data frame signal shown in FIG. 2, the initial frame signal comprises a first start code STI, a second start code STO, output point number detection data DO', a stop code SP, a CRC code and an ERR code. However, the output point number detection data DO' consists of "0s" of A bits to prevent the operation of the actuators at each node, where symbol A is set to be a number sufficiently larger than the number of all actuators used in this system. The error code ERR is provided to output a predetermined error code at the associated node when the node detects an error, and the main controller 100 generates the error code ERR of all "0" level.

Like the data frame signal already explained earlier, the initial frame signal is sequentially propagated to the nodes 10-1, 10-2, 10-3, 10-4 and 10-5, through which the output point number detection data DO' in the initial frame signal is allocated to the corresponding node and detection data of the sensor group obtained at the respective nodes are included into the initial frame signal. More specifically, at each of the respective nodes 10-1, 10-2, . . . , and 10-N, the data DI of associated one of the sensor groups 1-1, 1-2, . . . , and 1-N connected to the associated node is attached to the end of the first start code STI of the received initial frame signal, and data on associated one of the actuator groups 2-1, 2-2, . . . , and 2-N connected to the associated node is extracted from the output point number detection data DO' following the second start code STO.

Figure 4:
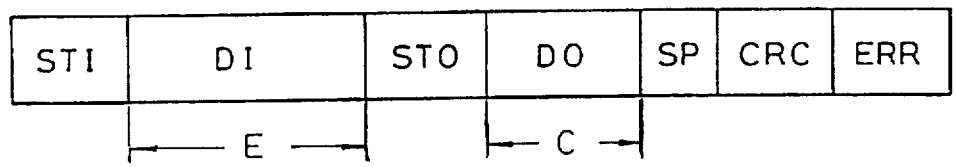
Figure 5A:
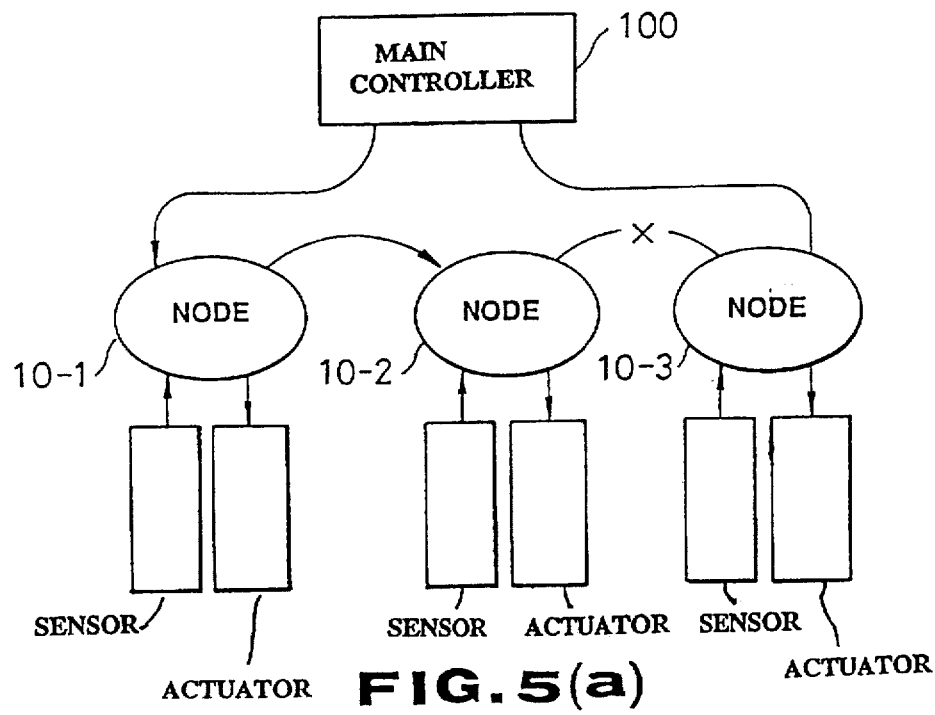
FIG. 5(a) schematically shows a block diagram of an arrangement of a serial controller to which the present invention is applied.
Figure 5B:
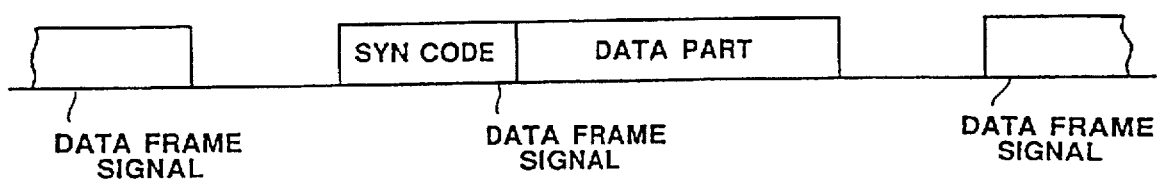
FIG. 5(b) conceptionally shows a frame structure of the frame signal.

Then, the initial frame signal, which is passed through the nodes 10-1, 10-2, . . . , and 10-(N−1) and issued from the node 10-N, is sent to an input circuit 50 of the main controller 100 in the form of a signal having such a structure as shown in FIG. 4.

The input circuit 50 performs its predetermined decoding operation over the received initial frame signal and then applies it to a switch SW2.

When the initial frame signal is input to the reception side of the main controller 100, the switch SW2 is already switched to its position (A-C) so that the received initial frame signal is sent to an input point number detecting unit 60 and to an output point number detecting unit 70.

The input point number detecting unit 60 counts the bit number E of the data D1 following the first start code in the received initial frame signal and applies the count result E to a sampling time generating circuit 80. The count value E indicates the number of all sensors connected to the nodes 10-1 to 10-N.

The output point number detecting unit 60 counts the bit number C of the data DO following the second start code STO in the received initial frame signal, subtracts the count value C from the bit number A of the output point number detection data DO' when the initial frame signal of FIG. 3 is sent, and applies its subtraction result LO (=A−C) to the normal transmission/reception circuit 20 and the sampling time generating circuit 80. The count value LO indicates the number of all actuators connected to the nodes 10-1 to 10-N.

The normal transmission/reception circuit 20 determines the length of the actuator drive data DO in the usual data frame signal of FIG. 2 on the basis of the received output point number LO.

Figure 7:
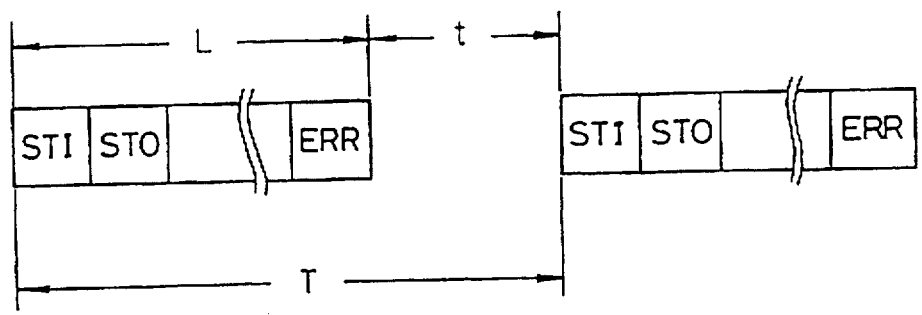
FIG. 7 is a diagram for explaining a sampling period.

The sampling time generating circuit 80, on the basis of the received input point number E, determines the transmission period T (sampling time) of the usual data frame signal to be sent from the normal transmission/reception circuit 20 (refer to FIG. 7), and controls the data transmission of the normal transmission/reception circuit 20 so that data frame signal is transmitted with the determined sampling time T: A predetermined relationship equation for decreasing an interval time t between one data frame signal and the next data frame signal with respect to the decreased received input point number E is previously set in the sampling time generating circuit 80, so that the sampling time generating circuit 80 finds the interval time t corresponding to the received input point number E. The sampling time generating circuit 80, which also receives the output point number LO, determines the length L of the data frame signal to be transmitted on the basis of the received output point number LO, adds the found interval time t to the signal length L, and determines (t+L) as the sampling time T.

And the sampling time generating circuit 80, when it is desired to transmit the data frame signal from the normal transmission/reception circuit 20, sends a clock signal Cs to the normal transmission/reception circuit 20 in synchronism with the above found sampling period T to transmit the data frame signal with the found sampling period T from the normal transmission/reception circuit 20. Of course, when the data frame signal is transmitted from the normal transmission/reception circuit 20, the switches SW1 and SW2 are both already switched to their position (A-B).

In this way, with the arrangement of FIG. 6, since the transmission period of the data frame signal is changed according to the all bit number of the sensors in the system, even when this arrangement is employed for such a system as to have small input/output point numbers, efficient data transmission can be realized and the length of the data frame signal can be automatically determined. The arrangement of FIG. 6 may be modified suitably in various ways. For example, such an arrangement may be employed that, during the detection of the input/output point numbers, only when a plurality of detection results coincide with each other, the detection data is input as correct data. Although the interval time t is determined by the input point number E in FIG. 6, the interval time t may be determined by the output point number LO or by the input point number LI and the output point number LO.

Figure 8:
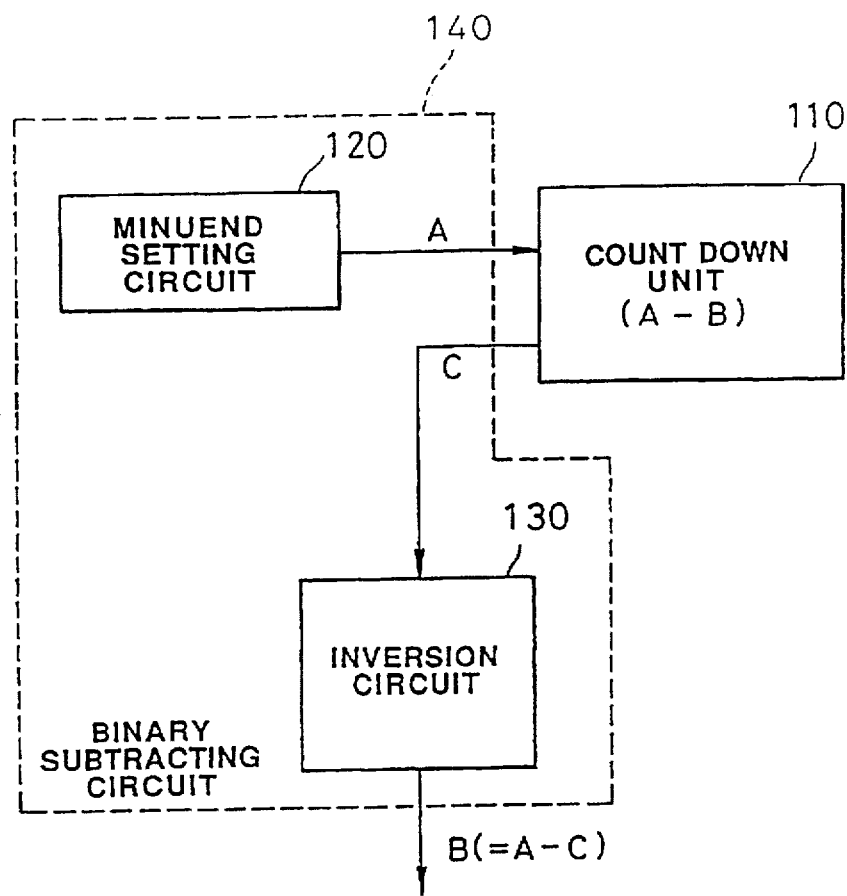
FIG. 8 is a block diagram of another embodiment of the present invention.

Shown in FIG. 8 is another arrangement of the present invention, which is used, for example, in the output point number detecting unit 70 in the main controller 100 of FIG. 6. In more detail, the output point number detecting unit 70 subtracts the bit number C of the data DO following the second start code STO in the received initial frame signal from the bit number A of the output point number detection data DO' during transmission of the initial frame signal of FIG. 3 to find the output point number LO; whereas a binary subtraction circuit 140 of FIG. 8, which comprises a minuend setting circuit 120 and an inversion circuit 130, performs a binary subtracting operation over the value A as a minuend and the value C as a subtrahend.

A count-down part 110, as in the aforementioned arrangement for detecting the output point number of the system shown in FIGS. 1 to 4 and FIG. 6, has a function of, when receiving the value A, counting down the value A by the value B to obtain the count-down result C (=A−B) and outputting the result C.

The minuend setting circuit 120, in which the value A that is larger than a value anticipated as the count-down value B and that has bits of all logical value "1" is previously set, sends the set value A to the count-down part 110. For example, when 13 (=1101 in binary notation) is anticipated as the value B, 15 (=1111 in binary notation) or more is set as the value A; while, when 4 (=0100 in binary notation) is anticipated as the value B, 15 (=1111 in binary notation) or more is also set as the value A. That is, the value A satisfies a relation A>B and is set to have bits of all logical value "1".

Accordingly, the count-down part 110 counts down the value B from the value A that has bits of all logical value "1" received from the minuend setting circuit 120 to detect its count-down result C (=A−B), and outputs the same bit number as the value A to the inversion circuit 130 of the binary subtraction circuit 140.

Figure 9:
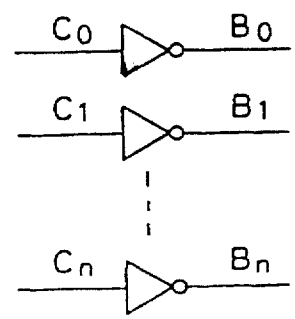
FIG. 9 is an example of an inversion circuit.

The inversion circuit 130, which comprises inverters corresponding in number to the same bit number as the output of the minuend setting circuit 120 as shown in FIG. 9, logically inverts through these inverters all the bits of the count-down result C (=A−B) received from the count-down part 110 and outputs 1's complement on the count-down result C as a logical inverted output.

The logical inverted output of the inversion circuit 130 corresponds to the subtraction result B of the binary subtraction circuit 140 which performs a binary subtracting operation of the set value A of the minuend setting circuit 120 as a minuend and the count-down result C of the count-down value unit 110 as a subtrahend, which is, a count-down value in the count-down unit 110.

That is, in this case, since all the bits of the minuend A are set to be logical value "1" in the minuend setting circuit 120, only logical inversion of the subtrahend C results in acquisition of the subtraction result B corresponding to (A−C).

For example, if 15 (=1111 in binary notation) is set as the 4-bit minuend A and the subtrahend C is 2 (0010 in binary notation), then the logical inversion of the subtrahend of 2 results in an answer of 13 (=1101 in binary notation). Further, when the subtrahend C is 3 (=0011 in binary notation), the logical inversion of the subtrahend of 3 results in an answer of 12 (=1100 in binary notation). In this case, since a relation A>C is satisfied, the answer B becomes always positive.

Figure 10:
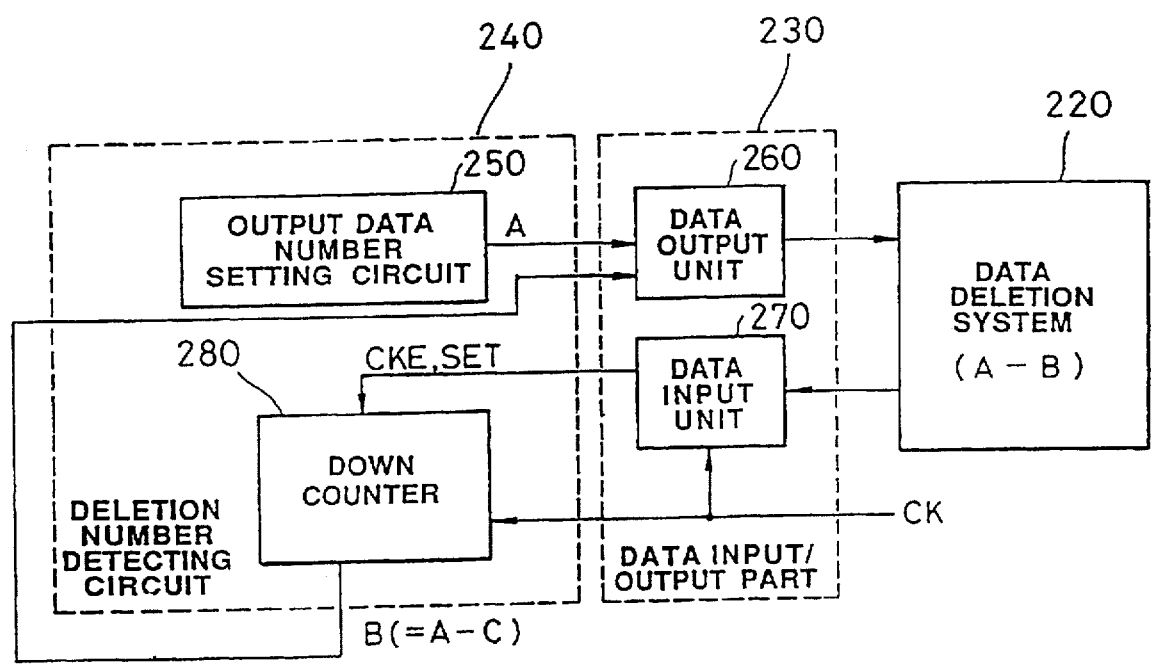
FIG. 10 is a block diagram of a further embodiment of the present invention.

FIG. 10 shows a modification of the arrangement of FIG. 8, in which a data deletion system 220 corresponds to that part of the plural nodes 10-1 to 10-N of the aforementioned arrangement of the system of FIGS. 1 to 4 and FIG. 6 but with the actuator data DO deleted; whereas a data input/output unit 230 and a deletion number detecting circuit 240 correspond to part of the circuits of the main controller 100.

Thus, the data deletion system 220, when receiving A of data, deletes B of data (B<A) from A of data and outputs C of data (=A−B). Meanwhile, on the side of the main controller 100, the data input/output unit 230 mainly performs input/output control over data and the deletion number detecting circuit 240 detects the deletion number B to be deleted at the data deletion system 220.

An output data number setting circuit 250 sets the data length A of the output point number detection data DO' in the initial frame signal of FIG. 3 to be sent to the data deletion system 220. In the illustrated example, the value A, which is larger than a value anticipated as the deletion number B and which has bits of all logical value "1", is previously set in the output data number setting circuit 250 and is sent to a data output unit 40. For example, 13 (=1101 in binary notation) is anticipated as the value B, 15 (=1111 in binary notation) or 31 (=11111 in binary notation) is set as the value A. That is, the value A satisfies the relation A>B and is set to have bits of all logical "1".

The data output unit 260 generates the initial frame signal containing the output point number detection data DO' corresponding in number to the received set value A and outputs it to the data deletion system 220. The data deletion system 220, as stated above, deletes B of data (B<A) from A of the received data to obtain C (=A−B) of the remaining data and outputs to a data input unit 270 such a frame signal containing C of data DO as shown in FIG. 4.

The data input unit 270 controls the operation of a down counter 280 on the basis of the data length C (=A−B) of the remaining data DO in the received frame signal, which will be detailed below.

The down counter 280 performs its down-counting operation to count down the data length C of the remaining data DO in the received frame signal from the data length A of the output point number detection data DO' set in the output data number setting circuit 250 to find the deletion number B at the data detection system, that is, detects the deletion number B under control of the operation of the data input unit 270. The interior structure of the down counter 280 is shown in FIG. 11.

Figure 11:
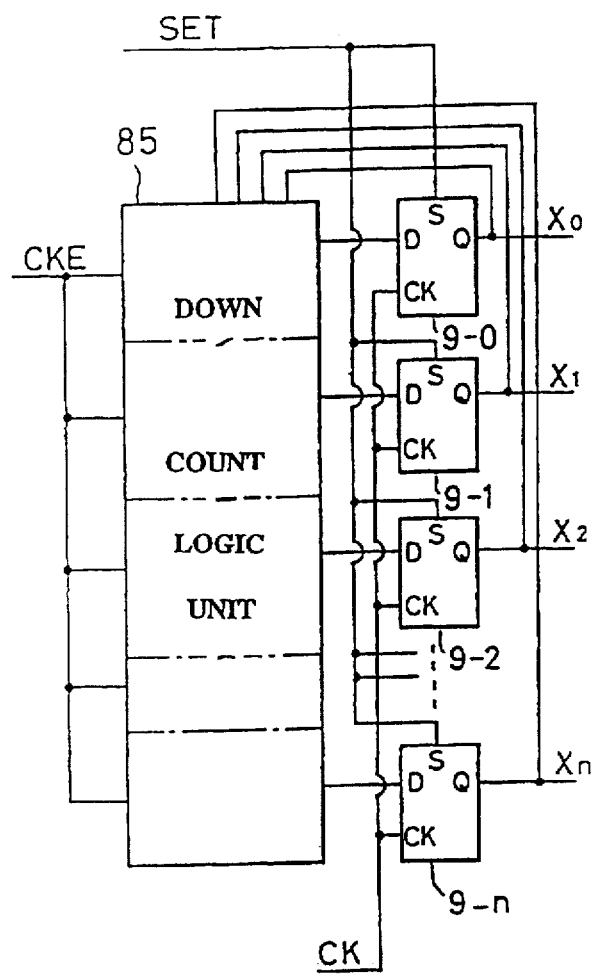
FIG. 11 is an example of a down-counter circuit.

The down counter 280 of FIG. 11, which has (n+1) bit outputs X0 to Xn, comprises a down count logic unit 85 and (n+1) flip-flops 9-0 to 9-n. The bit number (n+1) of the down counter 280 is equal to the bit number of the value A.

The down count logic unit 85 has logical circuits for perform their predetermined logical down-counting operations over the respective output bits X0 to Xn. Outputs of the flip-flops 9-0 to 9-n are fed back to the respective logical circuits. The down count logic unit 85 selects the next downcount value when a clock enable signal CKE becomes high (H) and selects the current downcount value when the clock enable signal is at low level (L). Outputs of the down count logic unit 85 are input to the flip-flops 9-0 to 9-n. The flip-flops 9-0 to 9-n are initialized by a set signal SET, and thereafter latch the outputs of the down count logic unit 85 in synchronism with the period of a clock signal CK to sequentially count down the initial set values in synchronism with the period of the clock signal CK. That is, the period of the clock signal CK corresponds to one data to be counted and the down count duration is determined by the clock enable signal CKE. For this reason, the down counter 280 counts down the initial set value by a number corresponding to the clock number of the clock signal CK during the high level of the clock enable signal CKE.

With such an arrangement, the data deletion system 220 is operated as follows to find the data deletion number B.

(a) Prior to finding of the data deletion number B, the initializing signal SET is sent from the data input unit 270 to the down counter 280 so that the outputs of the flip-flops 9-0 to 9-n of the down counter 280 are all initialized to be logical value "1".

(b) Thereafter, the initial frame signal containing A of the output point number detection data DO' having bits set to be "1" by the output data number setting circuit 250 is output from the data output unit 260 to the data deletion system 220 where B of data are deleted to obtain C of the remaining data DO. The data input unit 270, when receiving the initial frame signal containing C of the remaining data DO from the data deletion system 220, detects the second start code STO therefrom as shown in Parts (a) and (b) of FIG. 12, raises the clock enable signal CKE to its high level as delayed by a time corresponding to the length of the stop code SP at the time of the detection of the second start code STO, and lowers the clock enable signal to its low level at the time of detecting the stop code SP. That is, the clock enable signal CKE is at high level during a time corresponding to the presence of C of the remaining data DO in the initial frame signal received from the data deletion system 220 (refer to Part (b) of FIG. 12).

(c) Accordingly, down count logic unit 85 selects the next down-count value only during the high level of the clock enable signal CKE. Since the flip-flops 9-0 to 9-n of the down counter 280 receive the clock signal CK (refer to Part (c) of FIG. 12), on the other hand, the down counter 280 counts down the initial set value A (all "1s") by a number C corresponding to the number of clock pulses in the clock signal CK during the high level of the clock enable signal CKE, that is, perform a subtracting operation of (A–C) to find a deletion number B in the data deletion system.

In other words, the down counter 280 directly counts down the received data number C from the output data number A to find the unknown quantity B, whereby the subtractor in the prior art can be eliminated; while the initial value A is set in the down counter to have bits of all "1s", whereby the need of a circuit configuration for loading the initial value with respect to the down counter 280 can be eliminated and this initialization can be attained only by setting the down counter 280.

Figure 12:
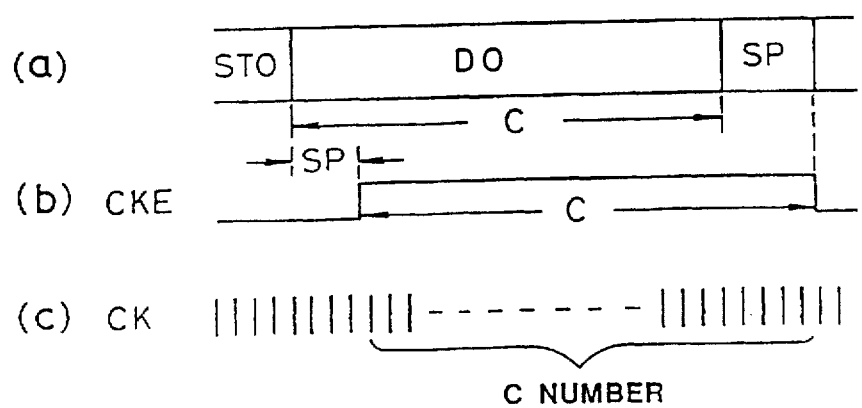
FIG. 12 is a timing chart for explaining the operation of the down counter in FIG. 11.
Figure 13:
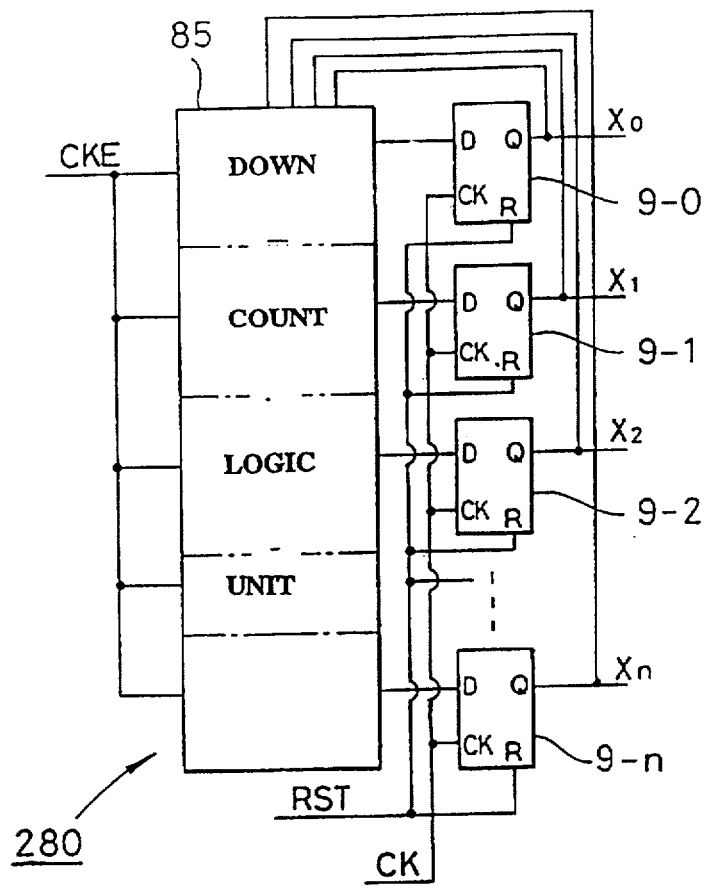
FIG. 13 is another example of the down counter circuit.
Figure 14:
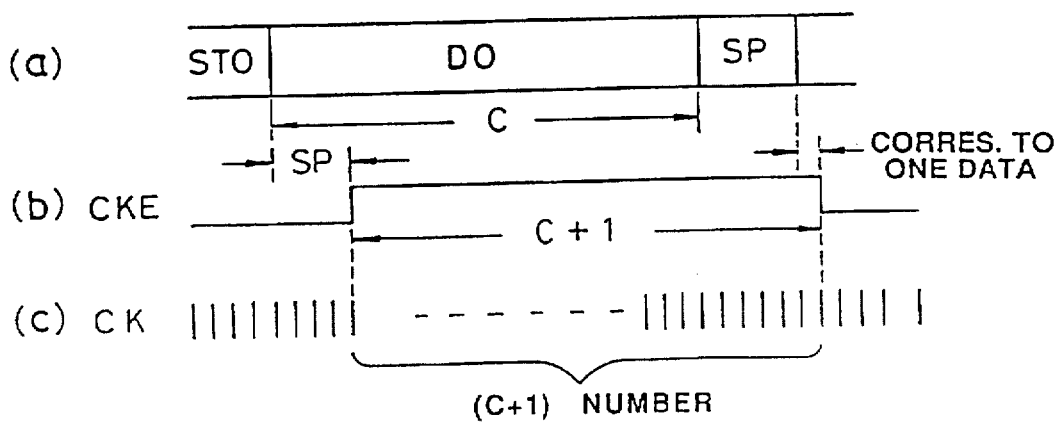
FIG. 14 is a timing chart for explaining the operation of the down counter of FIG. 13.

FIG. 12 shows a modification of the circuit of FIG. 11, in which the initial-value setting operation of the down counter 280 is attained not by the set signal SET but by a reset signal RST. Accordingly, when the down counter 280 has its initial value, the respective bits X0 to Xn are all initialized to be all logical value "0".

Meanwhile, the data input unit 270 raises the clock enable signal CKE to its high level only during a time corresponding to (a time during which the remainder data DO (C in bit number) in the initial frame signal received from the data deletion system 220 is present) plus (a duration corresponding to one period of the clock signal), whereby the down count logic unit 85 performs its downcounting operation during a time period corresponding to (C+1) bits of data.

Even in the present embodiment, the data output number setting circuit 250 is set to send the initial frame signal including the output point number detection data DO' of A bits set to be all "1".

In this case, the down counter 280 performs its downcounting operation from the initial value of "0" bits by a number (C+1) corresponding to the number of clocks in the clock signal CK during the high level of the clock enable signal CKE, which results in that a subtracting operation of (A–C) is carried out to find the deletion number B in the data deletion system. This is because a value counted down by 1 from the initial set value of all "0" bits has bits of all "1" and thus the counting down by (C+1) from the initial set value means to count down the value C from the output data number A of all "1".

The structure of FIG. 8 or FIG. 10 is not applied only to the system of FIGS. 1 to 4 but also may be applied to such another arbitrary system that an A of input data is reduced by an unknown B (B<A) to output C(A–B) of data.

Figure 15:
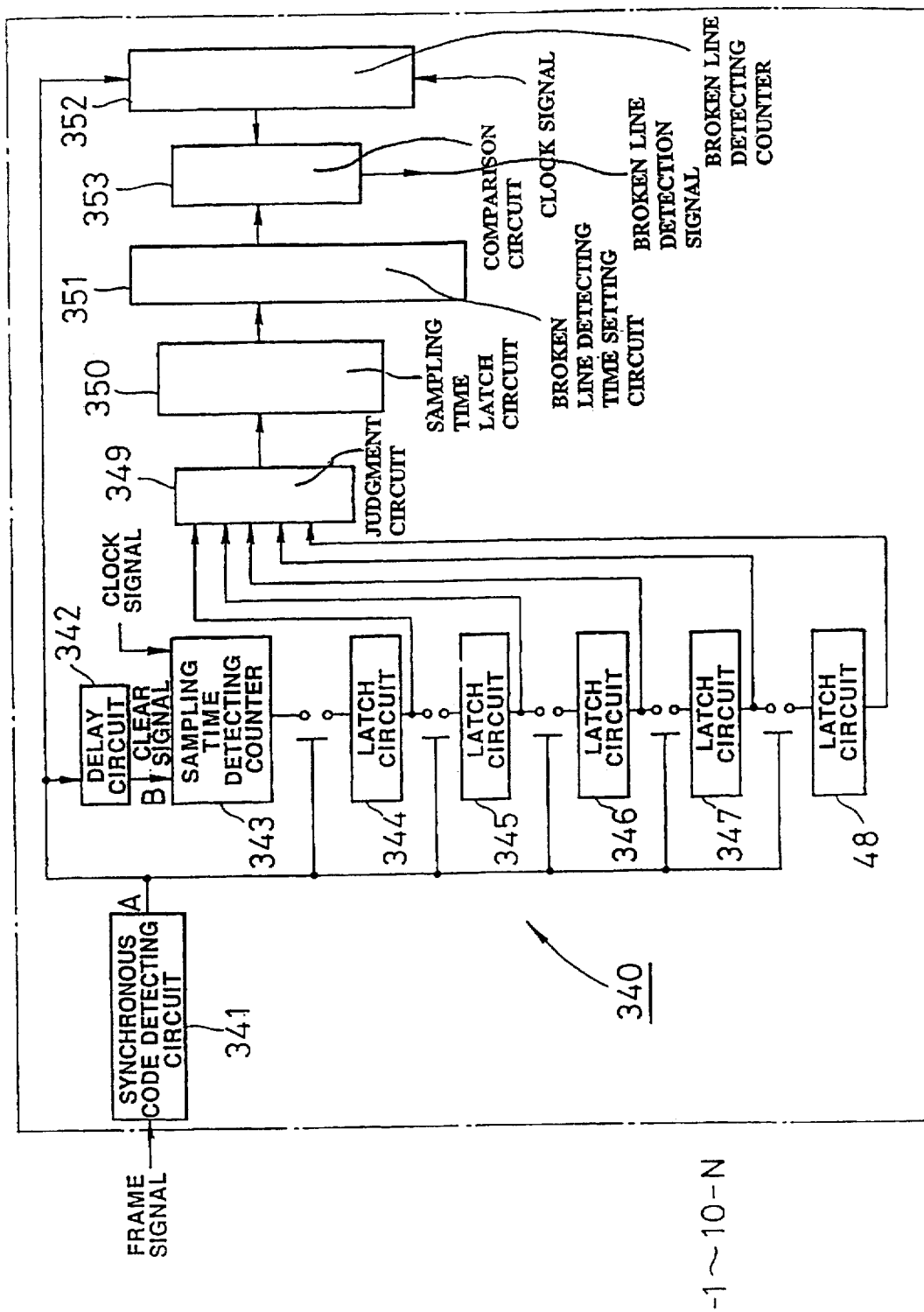
FIG. 15 is a block diagram of still another embodiment of the present invention.

Shown in FIG. 15 is a block diagram of an arrangement of a broken-line detection time setter 340 in each of the nodes 10-1 to 10-N in a serial controller in accordance with another embodiment of the present invention.

The broken-line detection time setter 340 of FIG. 15 comprises a synchronous code detecting circuit 341 for receiving the data frame signal from the previous stage of node or from the main controller 100, detecting a synchronous code (for example, the start code STI in FIG. 2) indicative of the head part of the input signal, and outputting a synchronous code detection signal A that is at its logical level "1" for a time corresponding to one bit length of data at the time of the detection; a delay circuit 342 for delaying the synchronous code detection signal A received from the synchronous code detection circuit 341 by a time corresponding to one bit of data and for outputting a clear signal B corresponding to the delayed synchronous code detection signal; a sampling time detecting counter 343 for counting the number of pulses in the clock signal and for clearing its counted value whenever receiving the clear signal B; 5 of latch circuits 344 to 348, when receiving the synchronous code detection signal A, for sequentially latching the count value of the sampling time detecting counter 343 to measure a time from the reception of the previous data frame signal to the reception of the next data frame signal 5 times consecutively; a judgement circuit 349 for judging the sampling time (which refers to the period of the data frame signal when viewed from the node side and which coincides with the transmission period of the initial frame signal issued from the main controller 100) of the frame signal on the basis of the time measured at the latch circuits 344 to 348 consecutively 5 times; a sampling time latch circuit 350 for latching the sampling time judged at the judgement circuit 349; a broken-line detection time setting circuit 351 for setting a broken-line detection time for detection of a broken state in the signal line between the associated node and the previous stage of node on the basis of the sampling time latched at the sampling time latch circuit 350; a broken-line detecting counter 352 for counting the number of pulses in the clock signal and each time the counter 352 receives the synchronous code detection signal A, clears its count value to measure a time from the reception of the previous data frame signal to the reception of the next data frame signal; and a comparison circuit 353 for sequentially comparing the broken-line detection time set at the broken-line detection time setting circuit 351 with the time measured at the broken-line detecting counter 352 and when the measures time exceeds the broken-line detection time, for outputting a broken-line detection signal indicative of an occurrence of a broken line in the signal line upstream the associated node.

Figure 16:
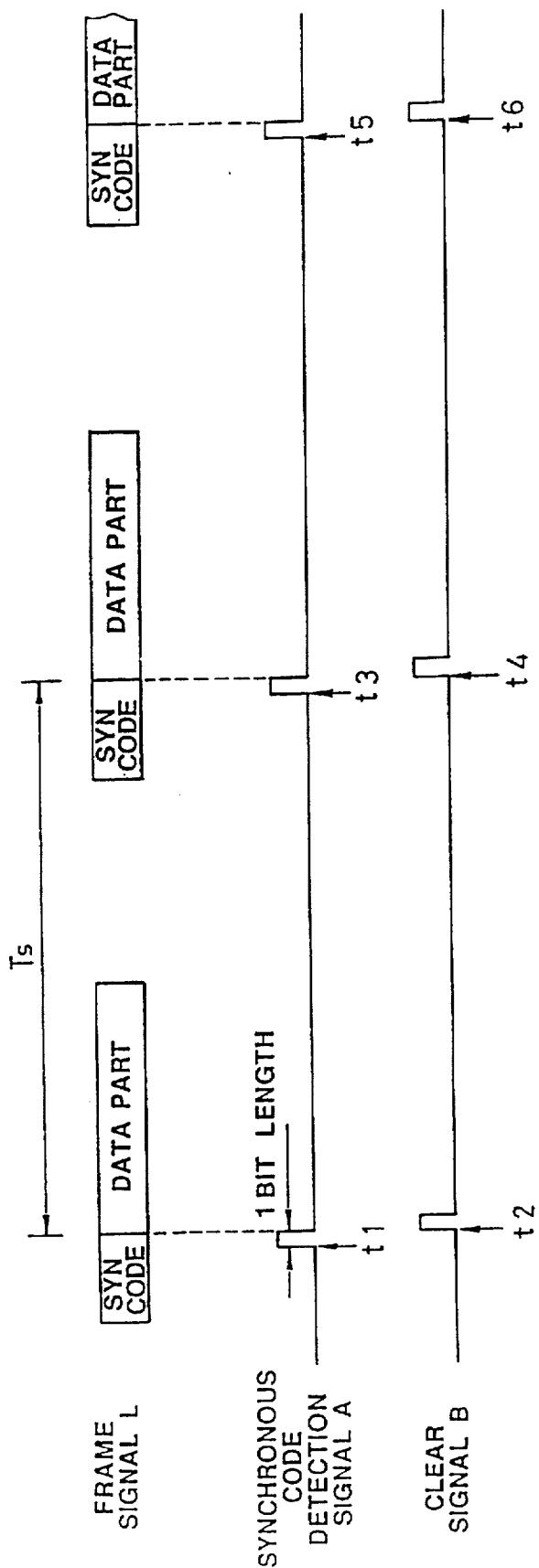
FIG. 16 is a timing chart of the frame signal when the frame signal is applied regularly to the embodiment of FIG. 15 at intervals of a constant period.

Wish such an arrangement, it is assumed that a data frame signal FL having a predetermined regular transmission period Ts as shown in FIG. 16 is applied to the synchronous code detection circuit 341. Then, the synchronous code detection circuit 341 detects, for example, the start code STI in the data frame signal FL at a time point t1, at a time point t3 after passage of the period Ts from the time point t1 and at a time point t5 after passage of the period Ts from the time point t3 respectively and outputs a broken-line code detection signal which is raised to its logical level "1" for a time point corresponding to one data bit at the respective time points. Meanwhile, the delay circuit 342 delays the broken-line code detection signal by the time point corresponding to one data bit and outputs a clear signal B which is raised to the logical level "1" for the time corresponding to one data bit respectively at time points t2, t4 and t3 after passage of the time of one data bit from the time points t1, t3 and t5. Accordingly, the latch circuits 344 to 348 latch the count value of the sampling time detecting counter 343 immediately before cleared by the clear signal B, that is, the times Ts, Ts, Ts, . . . at the time points t1, t3, t5, . . . respectively. The judgement circuit 349 receives 5 measured times latched at the latch circuits 344 to 348 and performs its sampling-time judging operation on the basis of these input measured times. This processing is considered to be carried out, for example, in the following manners.

(1) One of the 5 measured times which is most frequently measured is determined as the sampling time.

(2) Only when the same measured time is obtained 5 times, the measured time is determined as the sampling time.

That is, in the case of FIG. 16, the time Ts measured most frequently (5 times) is determined as the sampling time in the method (1). Even in the method (2), in this case, since the same measured time (Ts) is obtained 5 times, the measured time Ts is determined as the sampling time.

Thus, the sampling time latch circuit 350 latches the measured time Ts, and the broken-line detection time setting circuit 351 multiplies the latch output Ts by a predetermined constant n (such as 4) to obtain a multiplication value 4Ts and sets the multiplication value 4Ts as a broken-line detection time.

Therefore, while the broken-line detecting counter 352 outputs the measured time that is smaller than the value 4Ts (when a time from the reception of the previous frame signal FL to the reception of the next frame signal FL is smaller than a value 4T), the comparison circuit 353 will not output the broken-line detection signal. However, when the broken-line detecting counter 352 outputs the measured time that exceeds the value 4Ts, the comparison circuit 353 outputs the broken-line detection signal indicative of the occurrence of a broken line. The latter stage of circuit (not shown), in response to reception of the broken-line detection signal, performs operations including the output of the broken-line detection signal indicative of the occurrence of the broken line to the next node. However, this does not form the major subject of the present application and thus detailed explanation thereof is omitted.

Figure 17:
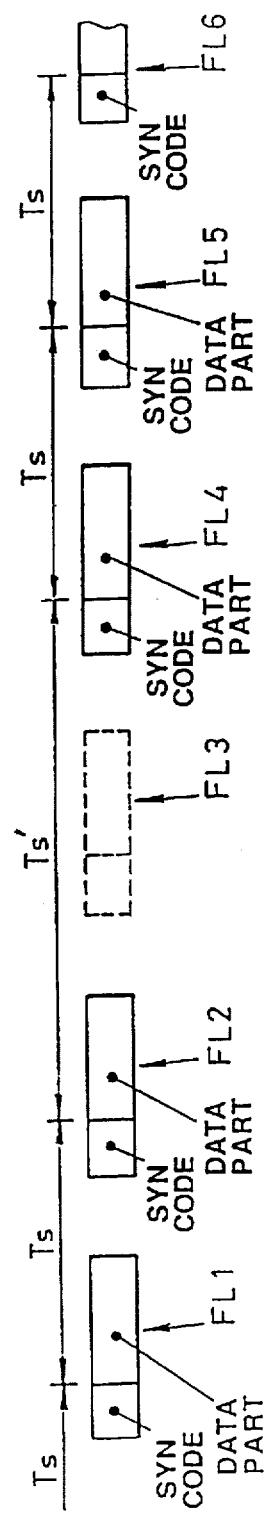
FIG. 17 is a timing chart of the frame signals when subjected to one frame signal missing.

When a communication error or the like takes place, this might cause missing of a frame signal FL3 between the frame signals FL2 and FL4 among frame signals FL1 to FL6 so that one of the periods between the five frame signals cannot be measured as the original period Ts as shown in FIG. 17. In other words, among the five latch circuits, the four latch circuits 344, 345, 347 and 348 can measure the period Ts but the latch circuit 346 will measure a time Ts' (which is twice the period Ts) which is different from the period Ts due to the missing of the frame signal.

Even when such missing of the frame signal takes place, the judgement circuit 349 performs the above operation (1), which results in that the count value Ts' is removed and the period Ts which corresponds to the measured time most frequently (4 times) measured is determined as the sampling time.

After this, as in the above case, a broken-line detection time 4Ts is set in the broken-line detection time setting circuit 351 so that, even after passage of 4Ts or more from the input of the previous frame signal, the comparison circuit 353 outputs the broken-line detection signal only when the next frame signal is not input.

Figure 18:
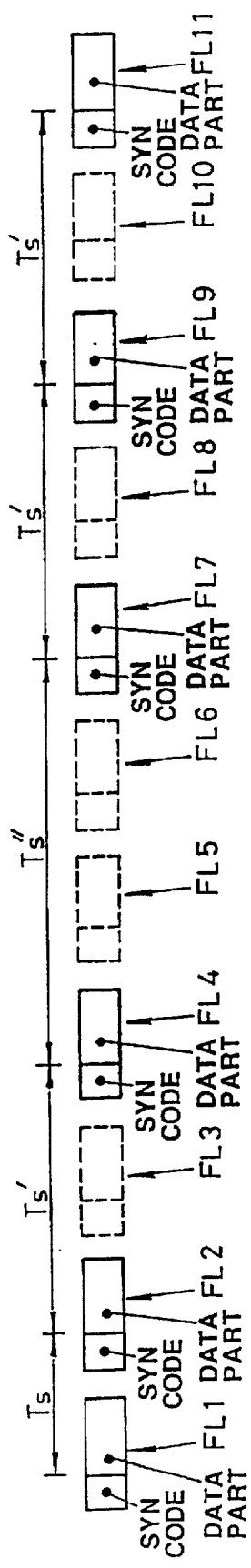
FIG. 18 a timing chart of the frame signals when missing of frame signals frequently takes place concentratedly.

Sometimes, concentrated missing of several frame signals takes place as shown in FIG. 18. That is, the frame signals FL1 to FL11 are originally supposed to be received at intervals of the period Ts, but a communication error or the like sometimes causes the frame signals FL3, FL5, FL6, FL8 and FL10 to be missed so that most of the periods between the frame signals cannot be measured as the period Ts. In this case, one 344 of the latch circuits 344 to 348 can measure the period Ts, but the other three latch circuits 345, 347 and 348 will measure the time Ts' (which is twice the period Ts) which is different from the period Ts and the latch circuit 346 will measure a time Ts" (which is 3 times the period Ts). Therefore, the execution of the aforementioned operation (1) at the judgement circuit 349 results in that not the period Ts but the measured time Ts' which is most frequently (three times) measured is determined as the sampling time.

For this reason, a very large broken-line detection time 4Ts' (8Ts) is set in the broken-line detection time setting circuit 351 so that the comparison circuit 353 outputs the broken-line detection signal first after passage of the broken-line detection time 4Ts' that is twice the normal broken-line detection time 4Ts. This becomes a serious problem from the safety viewpoint in some systems to which this serial controller is applied.

Figure 19:
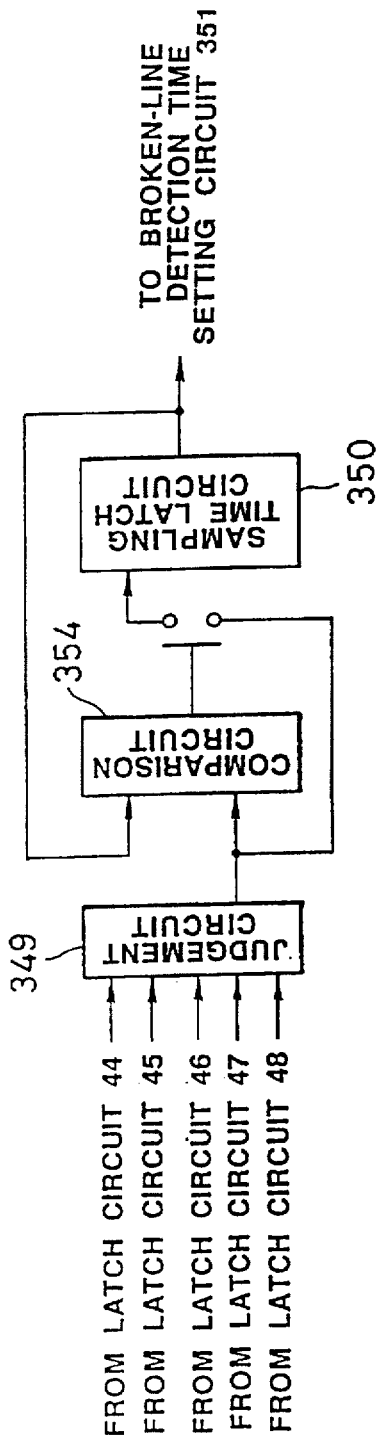
FIG. 19 is a block diagram of an exemplary modification of the embodiment of FIG. 15.

In order to prevent such a situation, a comparison circuit 354 is provided between the judgement circuit 349 and the sampling time latch circuit 350 in such a manner as shown in FIG. 19.

More specifically, the comparison circuit 354 judges whether or not the time judged in the current cycle at the sampling time latch circuit 349 is smaller than the time latched in the previous cycle at the sampling time latch circuit 350. Only when the time judged in the current cycle at the sampling time latch circuit 349 is smaller than the time latched in the previous cycle at the sampling time latch circuit 350, the content of the sampling time latch circuit 350 is updated by the time judged at the judgement circuit 349. On the contrary, if the time judged in the current cycle at the sampling time latch circuit 349 exceeds the time latched in the previous cycle at the sampling time latch circuit 350, then the content of the sampling time latch circuit 350 is not updated and remains at the previously latched time. Accordingly, even when the previously latched time at the sampling time latch circuit 350 is the period Ts and several frame signals are frequently missing as shown in FIG. 18 so that the output of the judgement circuit 349 becomes the time Ts', since a relation Ts'>Ts is satisfied, the comparison circuit 354 is operated to prevent the updating of the content of the sampling time latch circuit 350 and to maintain the content of the sampling time latch circuit 350 at the value Ts. As a result, the correct broken-line detection time 4Ts can be set in the broken-line detection time setting circuit 351 and thus the safety of the system can be assured.

As has been explained in the foregoing, in accordance with the foregoing embodiments, since the time from the reception of the previous frame signal to the reception of the next frame signal is measures consecutively 5 times and the broken-line detection time is variably set on the basis of these 5 measured time results, the optimum broken-line detection time can be sequentially and automatically set according to the actual system. As a result, troublesome setting of the broken-line detection time on a hardware basis and a trouble based on a setting error in the prior art can be eliminated in the present invention. Further, even when missing of frame signals frequently occurs and a time larger than the normal period of the frame signals is included in 5 measured time results, the correct broken-line detection time can be variably set based on the right period obtained in the previous cycle.

Although the time from the reception of the previous frame signal to the reception of the next frame signal has been measured consecutively 5 times and the broken-line detection time has been set on the basis of the 5 measured times in the foregoing embodiments, the present invention is not restricted to the specific example but such setting may be carried out on the basis of less than 5 or more than 5 measured time results, as a matter of course. In addition, the broken-line detection time setting means is not limited to such an arrangement as shown in FIG. 15 or 19 but suitable other arrangement may be employed so long as it can perform a function equivalent to the above.

Industrial Applicability

The present invention can be suitably employed for a system for centralizedly controlling various types of machines such as presses, machine tools, construction machines, ships and airplanes or for a system for centralizedly controlling unmanned transportation machines and unmanned storehouses.

We claim:

1. A calculating device including first calculating means for receiving a value A, counting down the value A by an unknown B (B<A) and outputting a count-down result C (=A−B) and, second calculating means for outputting the value A to the first calculating means, receiving the count-down result C from the first calculating means and obtaining the unknown B with the use of the value A and the count-down result C, wherein the second calculating means comprises:
setting means for setting bits of the value A to be all "1" in logical value and outputting the set value A to the first calculating means; and
complement calculating means for finding 1's complement on the count-down result C received from the first calculating means and outputting an obtained element value as the unknown B.

2. A data input/output system including a data deleting device for deleting B (B<A) of data from A of input data and outputting C (=A−B) of data and, a data input/output device for outputting the data number A to the data deleting device and receiving the data number C from the data deleting device, wherein the data input/output device comprises:

setting means for setting bits of the data number A output to the data deleting device to be all "1" in logical value;
counter means for counting the data number C received from the data deleting device; and
complement calculating means for finding 1's complement of each bit of the count value C counted in the counter means and outputting an obtained complement value as the deleted number B in the data deleting device.

3. A data input/output system including a data deleting device for deleting B (B<A) of data from A of input data and outputting C (=A−B) of data and a data input/output device for outputting the data number A to the data deleting device and receiving the data number C from the data deleting device, wherein the data input/output device comprises:
setting means for setting bits of the data number A output to the data deleting device to be all "1" in logical value;
clock signal generating means for generating clock signals corresponding in number to the data number C received from the data deleting device; and
a down counter for outputting count-down outputs and for setting bits corresponding to count-down outputs to be all "1" in logical value in its initial state, counting down a value in synchronism with the clock signal by the number C of the clock signal output from the clock signal generating means and outputting a count-down value as the deleted B in the data deleting device.

4. A data input/output system including a data deleting device for deleting B (B<A) of data from A of input data and outputting C (=A−B) of data and, a data input/output device for outputting a data number A to the data deleting device and receiving a data number C from the data deleting device, wherein the data input/output device comprises:
setting means for setting bits of the data number A output to the data deleting device to be all "1" in logical value;
clock signal generating means for generating clock signals corresponding in number to the data number C received from the data deleting device plus one (C+1); and
a down counter for setting bits corresponding to count-down outputs to be all "0" in logical value in its initial state, for counting down the initial value in synchronism with the clock signal by the number (C+1) of the clock signal from the clock signal generating means and outputting a count-down value as the deleted B in the data deleting device.

* * * * *